United States Patent
Su et al.

(10) Patent No.: US 9,846,798 B2
(45) Date of Patent: Dec. 19, 2017

(54) FULL-SCREEN FINGERPRINT IDENTIFICATION METHOD AND FULL-SCREEN FINGERPRINT IDENTIFICATION DEVICE

(71) Applicant: EverDisplay Optronics (Shanghai) Limited, Shanghai (CN)

(72) Inventors: Weisheng Su, Shanghai (CN); PingHsu Lai, Shanghai (CN); HsiaoYi Lin, Shanghai (CN)

(73) Assignee: EverDisplay Optronics (Shanghai) Limited, Shanghai (CN)

( * ) Notice: Subject to any disclaimer, the term of this patent is extended or adjusted under 35 U.S.C. 154(b) by 3 days.

(21) Appl. No.: 15/089,261

(22) Filed: Apr. 1, 2016

(65) Prior Publication Data

US 2016/0335467 A1 Nov. 17, 2016

(30) Foreign Application Priority Data

May 11, 2015 (CN) .......................... 2015 1 02359140

(51) Int. Cl.
*G06K 9/00* (2006.01)
*G06F 3/041* (2006.01)
*G06F 3/044* (2006.01)

(52) U.S. Cl.
CPC ........... *G06K 9/0002* (2013.01); *G06F 3/044* (2013.01); *G06F 3/0416* (2013.01)

(58) Field of Classification Search
CPC .. G06K 9/0002; G06K 9/00006; G06F 3/044; G06F 3/0412; G06F 21/32; G06F 3/0488; H04L 63/0861; H04W 12/06

USPC ........................................................ 382/124
See application file for complete search history.

(56) References Cited

U.S. PATENT DOCUMENTS

| | | | | |
|---|---|---|---|---|
| 4,577,345 A * | 3/1986 | Abramov | ............. | G06K 9/0002 340/5.82 |
| 7,099,497 B2 * | 8/2006 | Chou | ................... | G06K 9/0002 382/124 |
| 8,363,034 B2 * | 1/2013 | Tanimizu | ............... | G06F 3/0416 178/18.06 |
| 8,564,314 B2 * | 10/2013 | Shaikh | ................. | G06K 9/0002 324/658 |
| 8,766,931 B2 * | 7/2014 | Westhues | ................ | G06F 3/044 178/18.06 |

(Continued)

*Primary Examiner* — Kanjibhai Patel
(74) *Attorney, Agent, or Firm* — Wang Law Firm, Inc.

(57) ABSTRACT

A full-screen fingerprint identification method includes disposing a wire mesh on a touch panel. The wire mesh includes a plurality of metal wires. The metal wires are connected to a switch unit. A fingerprint identification area is appointed on the touch panel, and a portion of the switch unit associated with the metal wires in the fingerprint identification area is turned on to make the metal wires in the fingerprint identification area conductive for fingerprint identification. A full-screen fingerprint identification device includes a touch panel and a wire mesh disposed on the touch panel. The wire mesh includes a plurality of metal wires connected to a switch unit. The touch panel includes a fingerprint identification area. A portion of the switch unit associated with the metal wires in the fingerprint identification area can be turned on to make the metal wires in the fingerprint identification area conductive for fingerprint identification.

7 Claims, 6 Drawing Sheets

(56) References Cited

U.S. PATENT DOCUMENTS 9,448,675 B2\* 9/2016 Morein ................... G06F 3/044
2015/0220767 A1\* 8/2015 Yoon .................. G06K 9/00006
382/124

\* cited by examiner

FULL-SCREEN FINGERPRINT IDENTIFICATION METHOD AND FULL-SCREEN FINGERPRINT IDENTIFICATION DEVICE

CROSS REFERENCE TO RELATED APPLICATIONS

This application is based upon and claims priority to Chinese Patent Application No. 201510235914.0, filed on May 11, 2015, the entire contents of which are incorporated herein by reference.

BACKGROUND OF THE INVENTION

The present invention relates to a touch screen and, more particularly, to a full-screen fingerprint identification method and a full-screen fingerprint identification device.

The fingerprint identification technology conventionally used in public security for entry/exit control at borders, identification of criminals, and door access control of industries and houses has successfully been used in Apple iPhone 5S mobile phones and has obtained favor on the market, such that other smart phones follow this approach, resulting in an application trend in consumer electronics. Currently, the fingerprint identification is utilized in Apple iPhone 5S, Samsung Galaxy S5, and HTC One Max, and the manufacturers of these smart phones have a market share rate of more than 50%. Since the environments of mobile payment and network finance are more and more mature, the fingerprint identification can be incorporated with mobile electronic purses to replace identification by pin numbers.

Since the technologies of touch panels and chips are more mature, many large international companies integrate touch control with fingerprint identification transducers to form a cost-effective module product which is introduced into large-size tablet computers, super thin notebooks, and transformable hand-held devices to proceed with various identification applications in business network data access, financial trade services, and access to household computers.

However, in current practice, the touch panel and the fingerprint identification device are separate devices from each other. Thus, a solution is proposed to integrate the fingerprint identification with the touch panel, such that the fingerprint identification can be conducted in any location on the screen.

In current practice of the fingerprint identification function on a mobile phone, a user has to input the fingerprint in a specific area, such as the HOME key in Apple iPhone 5S and Samsung Galaxy S5. However, such a design incurs some problems that must be overcome. Firstly, the overall area of the mobile phone is increased, leading to limitation to the compactness of the product. Secondly, the separate devices result in complicated layout in the product, complicating the integrated circuits. Thirdly, the separate devices adversely affect the service life of the mobile phone.

BRIEF SUMMARY OF THE INVENTION

An objective of the present invention is to provide a full-screen fingerprint identification method and a full-screen fingerprint identification device to successfully combine the fingerprint identification function and the full screen into the touch panel.

In a first aspect, the present invention provides a full-screen fingerprint identification method including:

providing a touch panel and disposing a wire mesh on the touch panel, with the wire mesh including a plurality of metal wires, providing a switch unit and connecting the switch unit to the plurality of metal wires; and appointing a fingerprint identification area on the touch panel and turning on a portion of the switch unit associated with a portion of the plurality of metal wires in the fingerprint identification area to make the portion of the plurality of metal wires in the fingerprint identification area conductive for fingerprint identification.

Appointing the fingerprint identification area on the touch panel and turning on the portion of the switch unit associated with the portion of the plurality of metal wires in the fingerprint identification area can include:

identifying whether input of a personal message at a present time is required and obtaining a first identification message which is an identification result indicating that the input of the personal message is required;

selecting a reference point on the touch panel;

forming the fingerprint identification area on the touch panel using the reference point as a center, and sending an association message related to formation of the fingerprint identification area to the switch unit; and receiving the association message by the switch unit and turning on the portion of the switch unit associated with the portion of the plurality of metal wires in the fingerprint identification area.

The full-screen fingerprint identification method can further include:

identifying whether input of the personal message at the present time is required and obtaining a second identification message which is an identification result indicating that the input of the personal message is not required;

generating a touch control message according to the second identification message and sending the touch control message to the switch unit; and receiving the touch control message by the switch unit and turning on the portion of the switch unit associated with the portion of the plurality of metal wires on the touch panel to make the portion of the plurality of metal wires conductive for touch control operation.

The full-screen fingerprint identification method can further include:

identifying whether input of the personal message at the present time is required and obtaining a second identification message which is an identification result indicting that the input of the personal message is not required;

sending the second identification message to the switch unit; and receiving the second identification message by the switch unit, turning on the portion of the switch unit associated with the portion of the plurality of metal wires and turning off a remaining portion of the switch unit associated with remaining metal wires for touch control operation.

In a second aspect, the present invention provides a full-screen fingerprint identification device including a touch panel. A wire mesh is disposed on the touch panel and includes a plurality of metal wires. The plurality of metal wires is connected to a switch unit. The touch panel includes a fingerprint identification area. A portion of the switch unit associated with a portion of the plurality of metal wires in the fingerprint identification area is capable of being turned on to make the portion of the plurality of metal wires in the fingerprint identification area conductive for fingerprint identification.

The full-screen fingerprint identification device can further include:

an identification unit configured for identifying whether input of a personal message at a present time is required; and an association unit connected to the identification unit, with the association unit configured for receiving a first identification message which is an identification result indicating that the input of the personal message is required, wherein the touch panel is configured to permit selection of a reference point on the touch panel and to permit formation the fingerprint identification area using the reference point as a center, with the association unit connected to the switch unit, with the association unit configured for sending an association message related to formation of the fingerprint identification area to the switch unit to thereby turn on the switch unit associated with the portion of the plurality of metal wires in the fingerprint identification area, making the portion of the plurality of metal wires in the fingerprint identification area conductive for fingerprint identification.

The full-screen fingerprint identification device can further include a touch control unit connected to the identification unit, with the touch control unit configured for receiving a second identification message which is an identification result indicating that the input of the personal message is not required, and with the touch control unit configured to generate a touch control message according to the second identification message. The touch control unit is connected to the switch unit. The touch control unit is configured to send the touch control message to the switch unit to turn on the portion of the switch unit associated with the portion of the plurality of metal wires on the touch panel, making the plurality of metal wires conductive for touch control operation.

A spacing between two metal wires adjacent to each other can be 0-50 μm, and each of the plurality of metal wires can have a width of 5-10 μm.

The switch unit can include a controller and a plurality of electric switches connected to the controller. Each of the plurality of electric switches is connected to one of the plurality of metal wires.

By using the above solution, the present invention includes advantageous effects. Specifically, provision of the densely disposed metal wire mesh structure on the touch panel can produce a touch panel structure satisfying the fingerprint identification function, providing the resolution basis for fingerprint identification. The metal wires are connected to the switch unit for controlling conduction and non-conduction of the metal wires. When proceeding with fingerprint identification, a fingerprint identification area is appointed on the touch panel, the metal wires in the fingerprint identification area are made conductive, and the metal wires outside of the fingerprint identification area are made non-conductive, permitting fingerprint identification. When proceeding with touch control operation, a corresponding number of metal wires is made conductive according to the demand of the resistance, obtaining the corresponding equivalent capacitance and resistance, permitting touch control operation. The present invention utilizes projected capacitive touch control of mutual capacitive induction type is utilized to incorporate fingerprint identification into the touch panel, fulfilling the full-screen fingerprint identification in which the fingerprint identification function is integrated with the touch control function.

The present invention will be further described in connection with the accompanying drawings and specific embodiments.

DETAILED DESCRIPTION OF THE INVENTION

Figure 1:
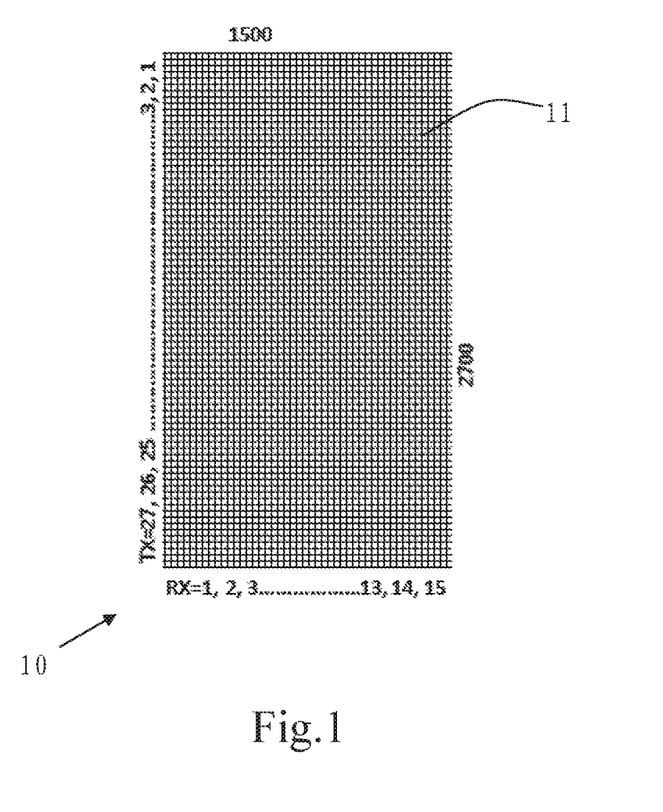
FIG. 1 is a schematic structural view of a full-screen fingerprint identification device according to the present invention.
Figure 2:
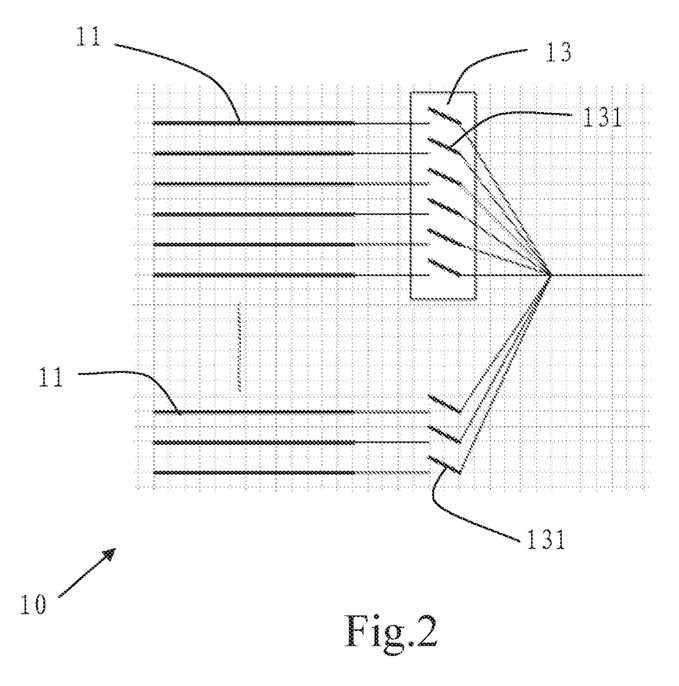
FIG. 2 is a schematic structural view illustrating connection of metal wires and a switch unit according to the present invention.

With reference to FIGS. 1 and 2, a full-screen fingerprint identification device according to the present invention includes a touch panel 10 and a wire mesh disposed on the touch panel 10. The wire mesh includes a plurality of metal meshes 11. A spacing between two metal wires 11 adjacent to each other is 0-50 μm. Each of the metal wires 11 has a width of 5-10 μm. Compared to ordinary wire meshes including a plurality of metal wires, the metal wires 11 according to the present invention are disposed more densely and have a higher resolution. Provision of the densely disposed metal wire mesh structure on the touch panel 10 can produce a touch panel structure satisfying the fingerprint identification function, providing the resolution basis for fingerprint identification. The metal wires 11 are connected to a switch unit 13 for controlling conduction and non-conduction of the metal wires 11. The switch unit 13 associated with the metal wires 11 is turned on or off to make the metal wires 11 conductive or non-conductive. The metal wires to be made conductive or non-conductive are selected according to the demands in the resolution and the resistance, providing two different panel modes respectively for fingerprint identification and touch control operation. Thus, the fingerprint identification is incorporated into the touch panel 10. Furthermore, projected capacitive touch control of mutual capacitive induction type is utilized to fulfill the full-screen fingerprint identification in which the fingerprint identification function is integrated with the touch control function.

A full-screen fingerprint identification method according to the present invention can be conducted by the following steps to perform the touch control function and the fingerprint identification function.

Firstly, as shown in FIGS. 1 and 2, a touch panel 10 is provided, and a wire mesh is disposed on the touch panel 10 in a warp direction and a weft direction. The wire mesh includes 2700×1500 metal wires 11. The spacing between two metal wires 11 adjacent to each other is 0-50 μm. Each of the metal wires 11 has a width of 5-10 μm. Provision of the densely disposed metal wire mesh structure on the touch panel 10 can produce a touch panel structure satisfying the fingerprint identification function, providing the resolution basis for fingerprint identification. As shown in FIG. 2, the metal wires 11 are connected to a switch unit 13. The switch unit 13 includes a controller and a plurality of electric switches 131 connected to the controller. Each of the electric switches 131 is connected to one of the metal wires 11. The conduction and non-conduction of the metal wires 11 are controlled by controlling on and off of the corresponding electric switches 131.

Figure 3:
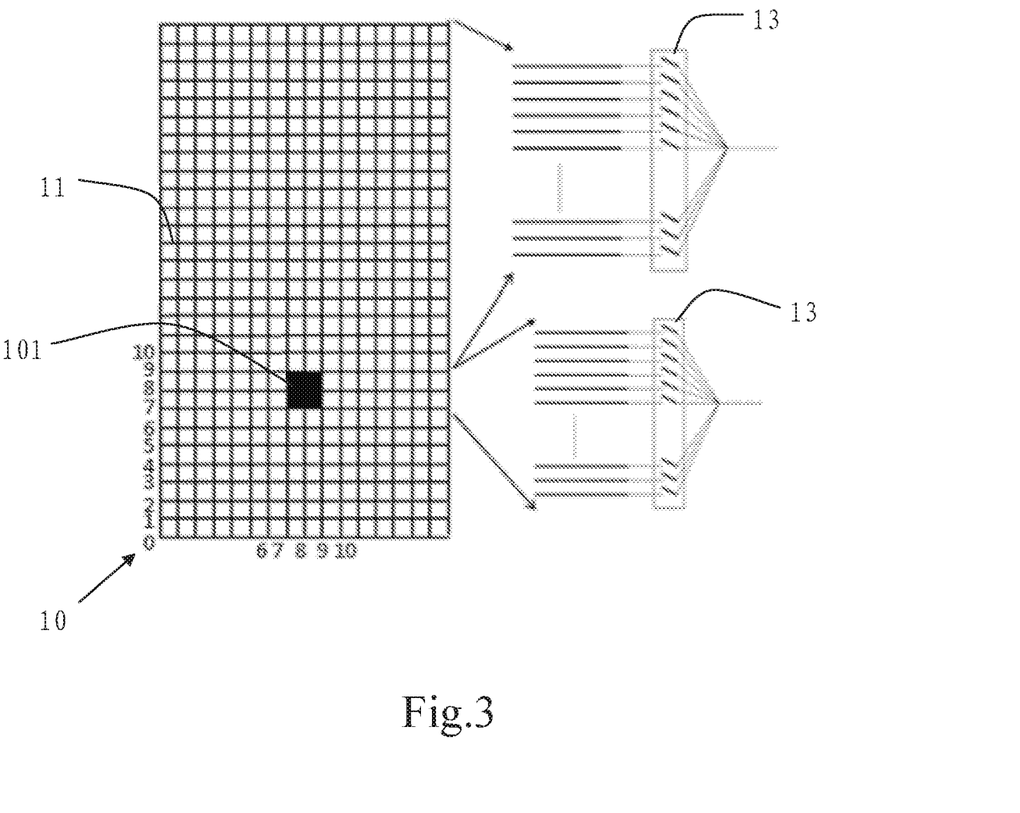
FIG. 3 is a schematic structural view of the touch panel during identification.

Then, as shown in FIG. 3, a fingerprint identification area 101 is appointed on the touch panel 10. A portion of the switch unit 13 associated with the metal wires 11 in the fingerprint identification area 101 is turned on to make the metal wires 11 in the fingerprint identification area 101 conductive for fingerprint identification.

In an example, appointing the fingerprint identification area 101 on the touch panel 10 and turning on the portion of the switch unit 13 associated with the metal wires 11 in the fingerprint identification area includes:

providing an identification unit to identify whether input of a personal message at the present time is required;

obtaining a first identification message which is an identification result indicating that the input of the personal message is required;

providing an association unit connected to the identification unit for receiving the first identification message, and selecting a reference point on the touch panel 10 to form the fingerprint identification area 101 on the touch panel 10 using the reference point as a center;

connecting the association unit with the switch unit 13 and sending an association message related to formation of the fingerprint identification area 101 to the switch unit 13; and receiving the association message by the switch unit 13 and turning on the portion of the switch unit 13 associated with the metal wires 11 in the fingerprint identification area 101 for fingerprint identification.

Figure 4:
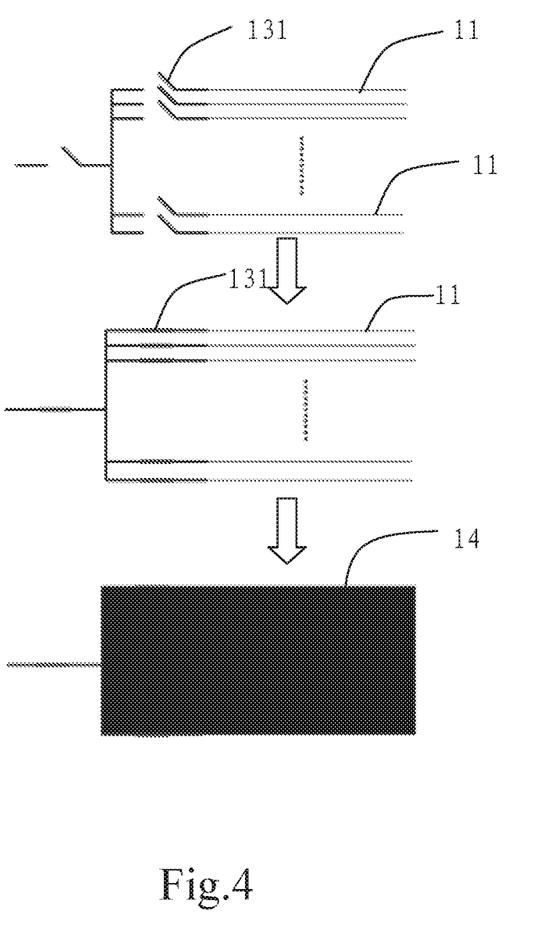
FIG. 4 is a schematic view illustrating formation of a first equivalent resistance during touch control operation.
Figure 5:
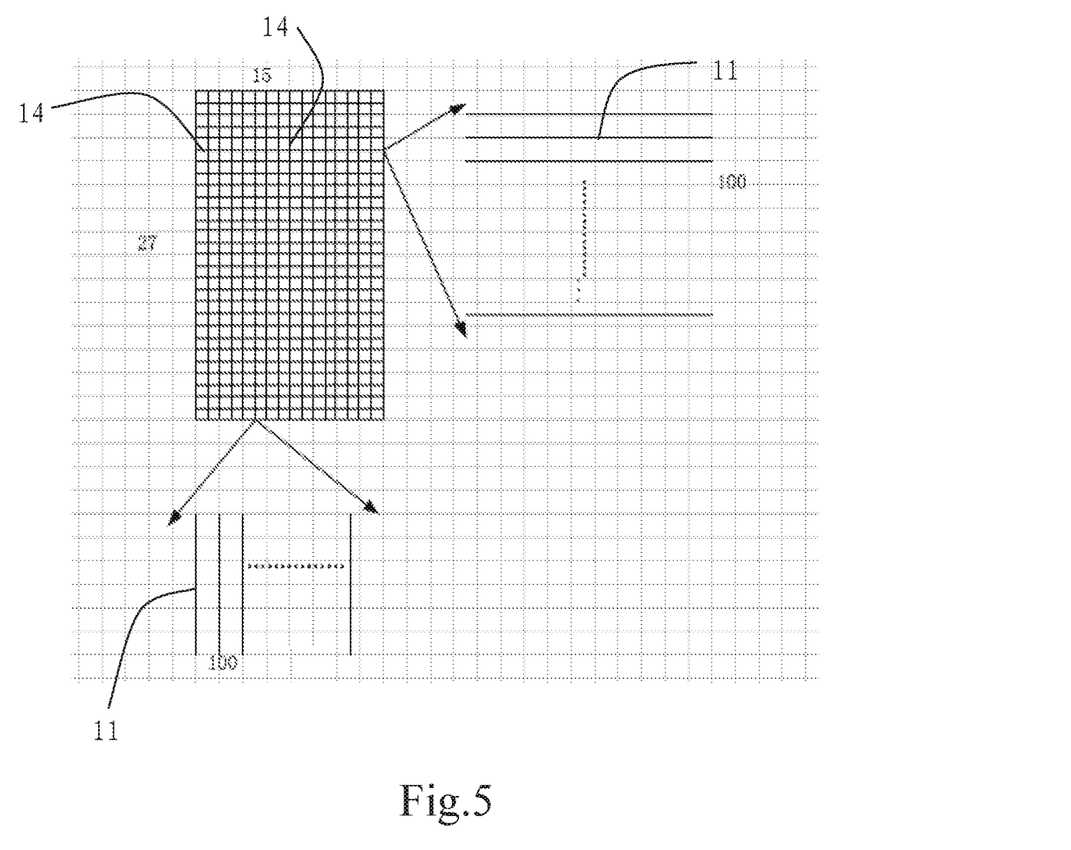
FIG. 5 is a schematic view of an equivalent 27×15 touch panel during touch control operation.
Figure 6:
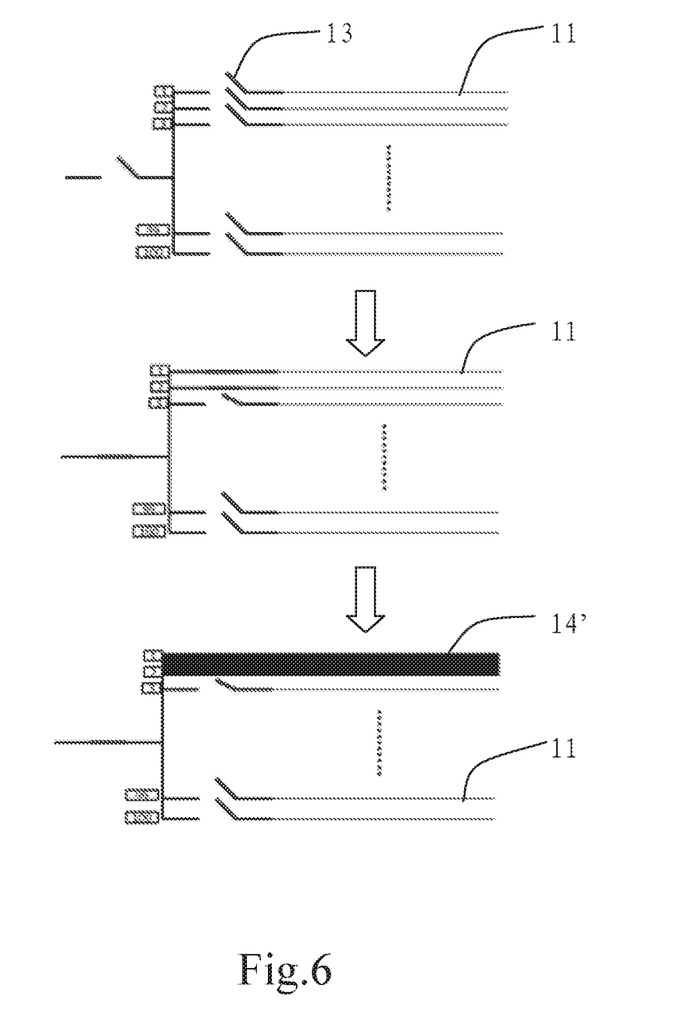
FIG. 6 is a schematic view illustrating formation of a second equivalent resistance during touch control operation.

With reference to FIGS. 4-6, the full-screen fingerprint identification method according to the present invention can further include the following steps:

identifying whether input of the personal message at the present time is required and obtaining a second identification message which is an identification result indicating that the input of the personal message is not required;

providing a touch control unit connected to the identification unit and the switch unit 13, with the touch control unit generating a touch control message according to the second identification message and sending the touch control message to the switch unit 13; and receiving the touch control message by the switch unit 13 and turning on the whole or a portion of the switch unit 13 associated with all or some of the metal wires 11 on the touch panel 10 to make all or some of the metal wires 11 conductive for touch control operation.

During the touch control operation, a corresponding number of metal wires 11 can be selected according to the demands in the capacitance and the resistance, and all or some of these metal wires 11 can be made conductive to fulfill the needs of touch control operation.

With reference to FIGS. 4 and 5, the electric switches 131 of the switch unit 13 associated with 100 adjacent metal wires 11 on a 2700×1500 touch panel 10 are turned on simultaneously, which is equal to a situation that the 100 metal wires 11 are associated with each other. In this case, the 100 metal wires 11 connected to each other in parallel is equivalent to a thick conductive wire 14. The capacitance is increased in comparison with the original single metal wire 11. Thus, the 2700×1500 touch panel 10 is equivalent to a 27×15 panel, satisfying the needs of touch control operation, which is advantageous to achieve a better touch control effect.

With reference to FIG. 6, when the touch control operation does not need a dense distribution of the metal wires 11, some of the electric switches 131 of the switch unit 13 associated with a portion of the metal wires 11 on the touch panel 10 can be turned on, and the remaining electric switches 131 of the switch unit 13 can be turned off to permit touch control operation. An example of operation of this arrangement will now be set forth.

Firstly, 100 metal wires 11 adjacent to each other are selected as a group. For ease of operation, 100 electric switches 131 associated with each group of 100 metal wires 11 are numbered from 1 to 100.

Then, two of each group of 100 metal wires 11 is selected to become conductive, and the remaining 98 metal wires are non-conductive, such that the two conductive metal wires 11 connected in parallel is equivalent to a conductive wire 14' to satisfy the demands in the resistance and the capacitance during the touch control operation. At the same time, the spacing between two adjacent conductive wires 14' is increased to avoid mutual interference resulting from dense distribution of the conductive wires 14', increasing the resolution.

Although the invention has been described in connection with the embodiments shown in the accompanying drawings, a person having ordinary skill in the art can make various modifications to the invention based on the above descriptions. Therefore, some details of the embodiment should not be construed to restrict the invention. The scope of the invention is limited by the accompanying claims.

The invention claimed is:

1. A full-screen fingerprint identification method comprising:

providing a touch panel and disposing a wire mesh on the touch panel, with the wire mesh including a plurality of metal wires, providing a switch unit and connecting the switch unit to the plurality of metal wires; and appointing a fingerprint identification area on the touch panel and turning on a portion of the switch unit associated with a portion of the plurality of metal wires in the fingerprint identification area to make the portion of the plurality of metal wires in the fingerprint identification area conductive for fingerprint identification, wherein appointing the fingerprint identification area on the touch panel and turning on the portion of the switch unit associated with the portion of the plurality of metal wires in the fingerprint identification area includes:

identifying whether input of a personal message at a present time is required and obtaining a first identification message which is an identification result indicating that the input of the personal message is required;

selecting a reference point on the touch panel;

forming the fingerprint identification area on the touch panel using the reference point as a center, and sending an association message related to formation of the fingerprint identification area to the switch unit; and receiving the association message by the switch unit and turning on the portion of the switch unit associated with the portion of the plurality of metal wires in the fingerprint identification area.

2. The full-screen fingerprint identification method as claimed in claim 1, further comprising:

identifying whether input of the personal message at the present time is required and obtaining a second identification message which is an identification result indicating that the input of the personal message is not required;

generating a touch control message according to the second identification message and sending the touch control message to the switch unit; and receiving the touch control message by the switch unit and turning on the portion of the switch unit associated with the portion of the plurality of metal wires on the touch panel to make the portion of the plurality of metal wires conductive for touch control operation.

3. The full-screen fingerprint identification method as claimed in claim 1, further comprising:

identifying whether input of the personal message at the present time is required and obtaining a second identification message which is an identification result indicting that the input of the personal message is not required;

sending the second identification message to the switch unit; and receiving the second identification message by the switch unit, turning on the portion of the switch unit associated with the portion of the plurality of metal wires and turning off a remaining portion of the switch unit associated with remaining metal wires for touch control operation.

4. A full-screen fingerprint identification device comprising a touch panel, with a wire mesh disposed on the touch panel and including a plurality of metal wires, with the plurality of metal wires connected to a switch unit, with the touch panel including a fingerprint identification area, wherein a portion of the switch unit associated with a portion of the plurality of metal wires in the fingerprint identification area is capable of being turned on to make the portion of the plurality of metal wires in the fingerprint identification area conductive for fingerprint identification;

an identification unit configured for identifying whether input of a personal message at a present time is required; and an association unit connected to the identification unit, with the association unit configured for receiving a first identification message which is an identification result indicating that the input of the personal message is required, wherein the touch panel is configured to permit selection of a reference point on the touch panel and to permit formation the fingerprint identification area using the reference point as a center, with the association unit connected to the switch unit, with the association unit configured for sending an association message related to formation of the fingerprint identification area to the switch unit to thereby turn on the switch unit associated with the portion of the plurality of metal wires in the fingerprint identification area, making the portion of the plurality of metal wires in the fingerprint identification area conductive for fingerprint identification.

5. The full-screen fingerprint identification device as claimed in claim 4, further comprising:

a touch control unit connected to the identification unit, with the touch control unit configured for receiving a second identification message which is an identification result indicating that the input of the personal message is not required, and with the touch control unit configured to generate a touch control message according to the second identification message, with the touch control unit connected to the switch unit, with the touch control unit configured to send the touch control message to the switch unit to turn on the portion of the switch unit associated with the portion of the plurality of metal wires on the touch panel, making the plurality of metal wires conductive for touch control operation.

6. The full-screen fingerprint identification device as claimed in claim 5, wherein a spacing between two metal wires adjacent to each other is 0-50 μm, and wherein each of the plurality of metal wires has a width of 5-10 μm.

7. The full-screen fingerprint identification device as claimed in claim 4, wherein the switch unit includes a controller and a plurality of electric switches connected to the controller, and wherein each of the plurality of electric switches is connected to one of the plurality of metal wires.

* * * * *